US011007108B2

(12) United States Patent
FitzPatrick et al.

(10) Patent No.: US 11,007,108 B2
(45) Date of Patent: May 18, 2021

(54) ROLLATOR HAVING AUTO BRAKE SYSTEM

(71) Applicant: Avenue Mobility Ltd, Stamford, CT (US)

(72) Inventors: Helen Ix FitzPatrick, Greenwich, CT (US); Geri W. Roper, Greenwich, CT (US); Kenneth A Tarlow, San Rafael, CA (US)

(73) Assignee: Avenue Mobility, Ltd., Stamford, CT (US)

( * ) Notice: Subject to any disclaimer, the term of this patent is extended or adjusted under 35 U.S.C. 154(b) by 0 days.

(21) Appl. No.: 16/367,765

(22) Filed: Mar. 28, 2019

(65) Prior Publication Data

US 2019/0298601 A1    Oct. 3, 2019

Related U.S. Application Data

(60) Provisional application No. 62/649,637, filed on Mar. 29, 2018.

(51) Int. Cl.
*A61H 3/04*    (2006.01)
*B62B 5/04*    (2006.01)

(52) U.S. Cl.
CPC ............ *A61H 3/04* (2013.01); *B62B 5/0404* (2013.01); *B62B 5/0485* (2013.01); *A61H 2003/046* (2013.01)

(58) Field of Classification Search
CPC .. A61H 3/04; A61H 2003/046; B62B 5/0404; B62B 5/0485

USPC ................... 188/19, 20, 29, 57, 2 F
See application file for complete search history.

(56) References Cited

U.S. PATENT DOCUMENTS

| 2,613,582 | A | * | 10/1952 | Harshberger | .......... A01B 39/10 |
| | | | | | 172/40 |
| 4,046,374 | A | * | 9/1977 | Breyley | .................... A61H 3/04 |
| | | | | | 482/68 |
| 4,384,713 | A | | 5/1983 | Deutsch et al. | |
| 6,338,355 | B1 | | 1/2002 | Cheng | |
| 10,470,966 | B1 | * | 11/2019 | Smith Swerdlow | ..... A61H 1/00 |
| 2009/0045021 | A1 | * | 2/2009 | Einbinder | .................. F16C 1/10 |
| | | | | | 188/2 D |
| 2017/0129523 | A1 | * | 5/2017 | Hane | .......................... A61H 3/04 |
| 2017/0258664 | A1 | * | 9/2017 | Purcell | ..................... A61H 3/04 |
| 2018/0242888 | A1 | * | 8/2018 | Schmutzer | ............ A61B 5/1112 |

* cited by examiner

*Primary Examiner* — Pamela Rodriguez
(74) *Attorney, Agent, or Firm* — Wissing Miller LLP (57) ABSTRACT

A rollator having an auto brake system made of a rigid frame assembly, a pair of forward facing swivel wheels, a pair of rearward facing non-swivel wheels, a pair of support handles, a pair of momentary electrical switches, a seat member, a back-rest member and a pair of electro-mechanical brake assemblies. The electro-mechanical brake assemblies are mounted on the frame assembly just above each rearward facing non-swivel wheel. The momentary electrical switches are mounted on the support handles. The brake assembly is actively engaged when the momentary electrical switches are not pressed and unengaged when the momentary electrical switches are pressed by the user. A preferred embodiment includes a pair of LED lights mounted on the front end of each the support handle, the LED lights being aimable by the user.

17 Claims, 9 Drawing Sheets

ROLLATOR HAVING AUTO BRAKE SYSTEM

CROSS REFERENCE TO RELATED APPLICATIONS

The present application claims priority under 35 U.S.C. § 119 to U.S. Provisional Patent Application No. 62/649,637, filed on Mar. 29, 2018, which is incorporated herein by reference.

FIELD OF THE INVENTION

This invention relates generally to the field of mobility assisting devices and more specifically to a rollator having an auto brake system.

BACKGROUND

Rollators are mobility assisting devices that people use who need support during normal walking activity. Rollators typically have four wheels—two non-swivel wheels in the rear and two swivel wheels in the front. A frame assembly supports the wheels and also includes support handles that the user holds onto while walking forward or backward.

Whereas, a walker type mobility device includes two forward facing wheels and two rearward facing friction pads to limit and control forward motion, a rollator mobility device typically employs four rolling wheels. A result of this design is if a user accidentally falls forward and does not have time to engage the bicycle type hand grip brakes, he or she will continue to fall forward thereby incurring possible serious injury. In fact, this type of fall is common enough that many senior living facilities ban the use of rollators altogether.

It would therefore be an advantage to incorporate an automatic braking system that engages the instant that a user loses control of the rollator.

SUMMARY

One object of the disclosure is to provide a rollator that includes an auto braking system that automatically engages if and when the user begins to lose control of the rollator.

Another object of the disclosure is to provide a rollator that includes forward facing, aimable LED lamps to help the user see in dimly lit environments.

Other objects and advantages of the present disclosure will become apparent from the following descriptions, taken in connection with the accompanying drawings, wherein, by way of illustration and example, an embodiment of the present disclosure is disclosed.

In accordance with a preferred embodiment, there is disclosed rollator having auto brake system comprising: a rigid frame assembly, a pair of forward facing swivel wheels, a pair of rearward facing non-swivel wheels, a pair of support handles, a pair of momentary electrical switches, a seat member, a back rest member, a pair of electro-mechanical brake assemblies, said electro-mechanical brake assemblies mounted on said frame assembly just above said rearward facing non-swivel wheels, said momentary electrical switches mounted on said support handles, said brake assembly being actively engaged when said momentary electrical switches are not pressed, and said brake assembly being unengaged when said momentary electrical switches are pressed by the user.

BRIEF DESCRIPTION OF THE DRAWINGS

The drawings constitute a part of this specification and include exemplary embodiments to the disclosure, which may be embodied in various forms. It is to be understood that in some instances various aspects of the disclosure may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
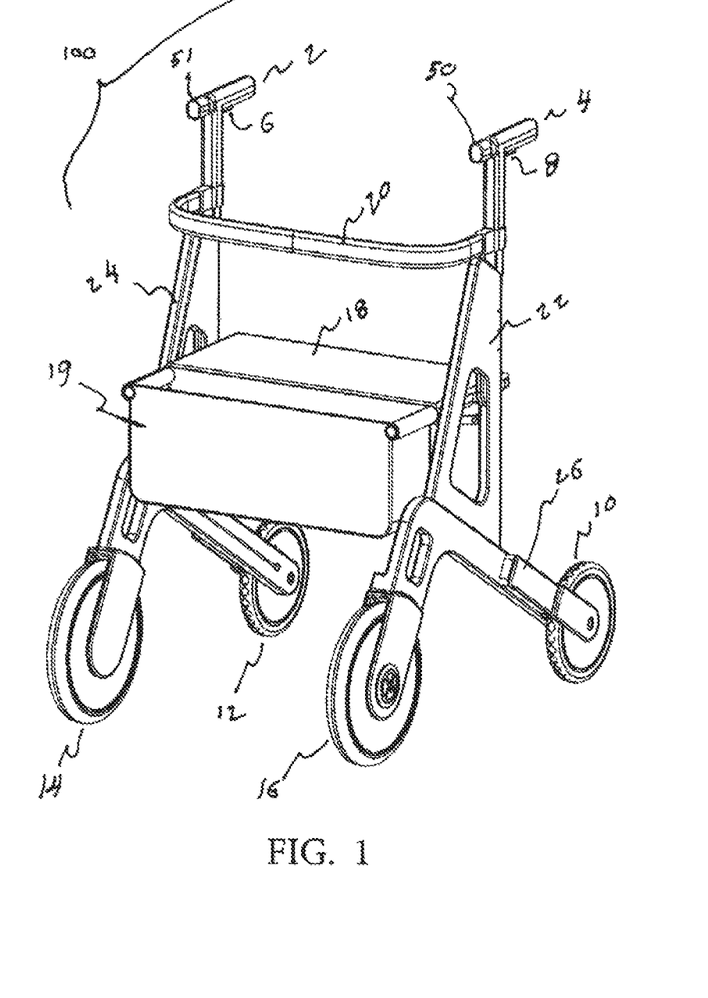
FIG. 1 is a perspective view of an embodiment according to the disclosure.

Referring now to FIG. 1 we see a perspective view of the rollator of the present invention 100. The rollator 100 consists partly of a frame assembly 22, 24, two forward facing swivel wheels 14, 16 and two rearward facing non-swivel wheels 10, 12. A pair of hand grips 2, 4 reside at the top portion of the frame 22, 24. A seat member 18 extends from one side of the frame 24 to the other side of the frame 22. An optional carrying compartment 19 is also shown. A back rest 20 can support a user when he or she is sitting on seat 18. Forward facing LED lights 50, 51 can be turned on by the user when traveling in a dimly lit environment. The lights 50, 51 are pinned in the rear and aimable up or down. Electro-mechanical brake housing 26 can be seen and will be described in detail below.

Figure 2:
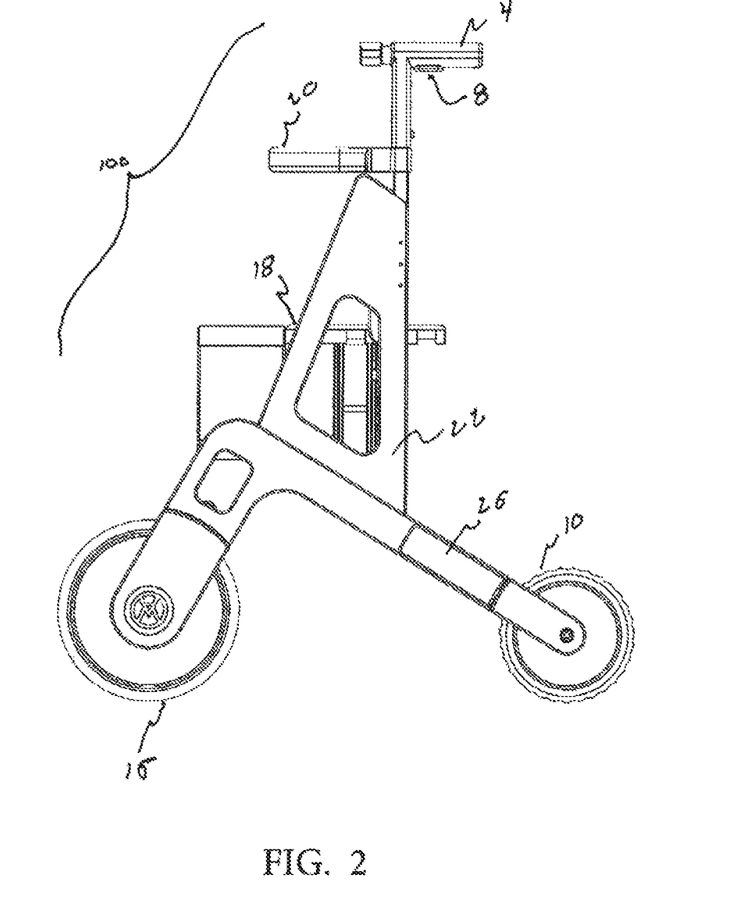
FIG. 2 is a side view of the embodiment of FIG. 1.

FIG. 2 is a side view of the invention 100. According to one embodiment, the frame member 22 is constructed of lightweight aluminum and is designed to support up to 500 pounds. According to another embodiment, frame member 22 is constructed of other high strength materials including other metals, for example, steel, polymers, composite materials, and combinations thereof. Frame member 22 may be identical to frame member 24, which may reduce manufacturing costs.

Figure 3:
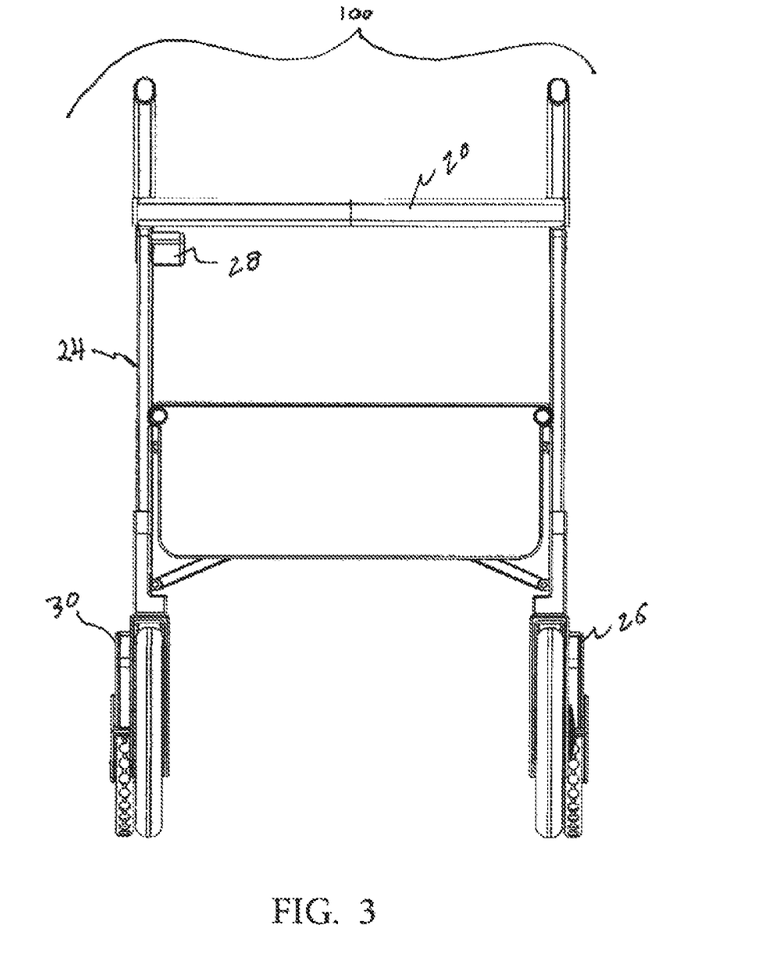
FIG. 3 is a front view of the embodiment of FIG. 1.

FIG. 3 is a front view of the invention 100. In this view, electro-mechanical housings 26, 30 can be seen as well as pedometer housing 28, mounted to frame member 24.

Figure 4:
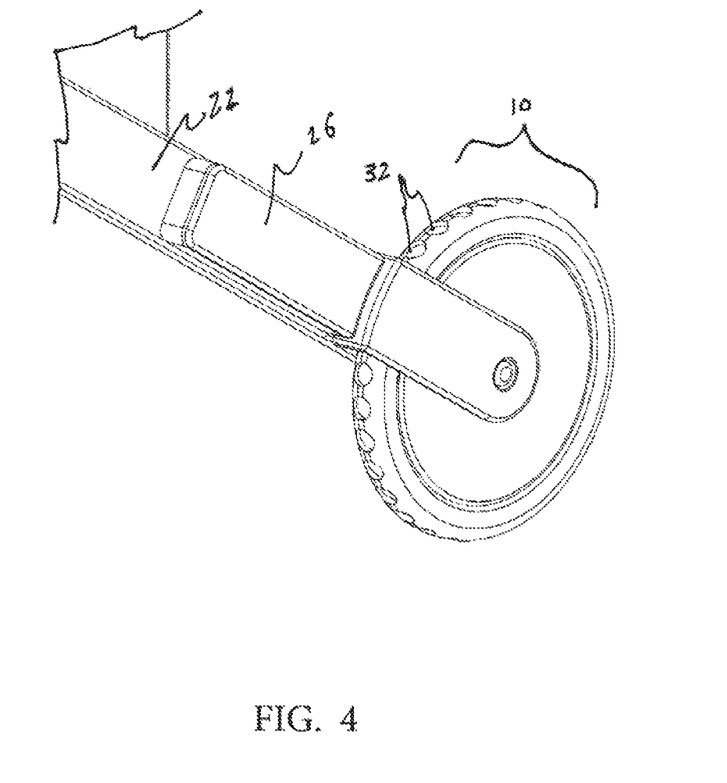
FIG. 4 is a partial perspective view of the frame and brake housing mounted above a non-swivel wheel.
Figure 5:
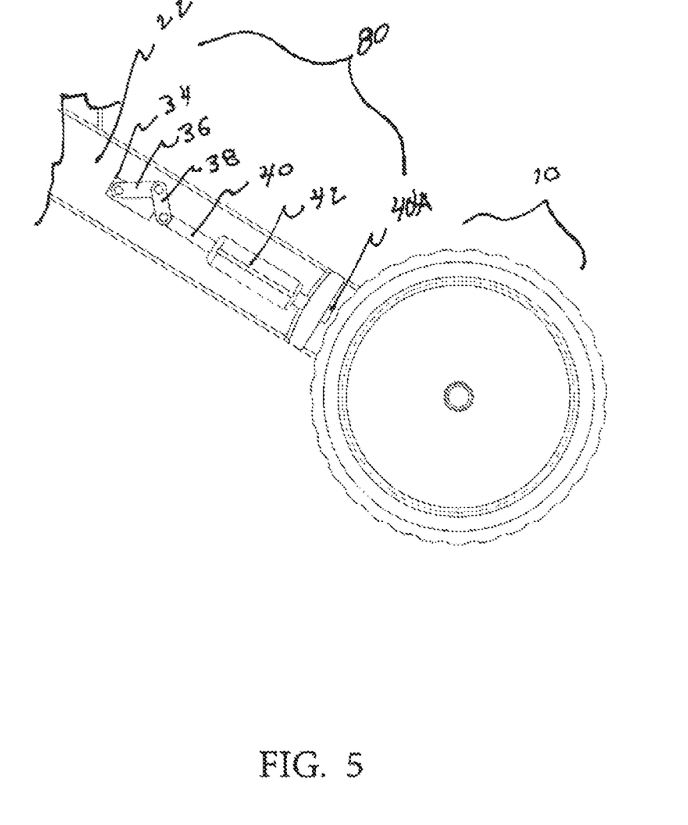
FIG. 5 is a partial side view of the frame and non-swivel wheel with the brake assembly housing removed and the brake post in the disengaged position.

FIG. 4 shows a partial perspective view of frame 22 and housing 26 as well as non-swivel wheel 10 which includes a plurality of depressions 32 evenly spaced along the perimeter of the wheel 10 tire, FIG. 5 is a partial side view of the frame 22 with the housing 26 removed showing the electro-mechanical braking assembly 80. A servo motor 34, powered by a portable power supply (not shown) is mounted to frame member 22. A first linkage 36 is mounted to the shaft of servo motor 34. A second linkage member 38 is mounted to the first linkage member 36. An elongate post 40 is mounted at one end to second linkage member 38. The elongate post 40 is slidably retained within linear bearing member 42. The tip 40A of post 40 is shown in the unengaged position. This is the position that is active when a user is pressing one or the other of the momentary switches 6, 8. Thus, a user can allow the device to move, while only one hand is on the handles 2, 4. For a user less prone to falling, being able to put the device in a mobile mode even when only one hand is holding the handles may be convenient. Also, where a user has the use of only one hand, such an arrangement may be necessary. According to a further embodiment, both switches 6, 8 must be actuated, and thus both of the user's hands must be holding the grips, to allow the rollator to move.

Figure 6:
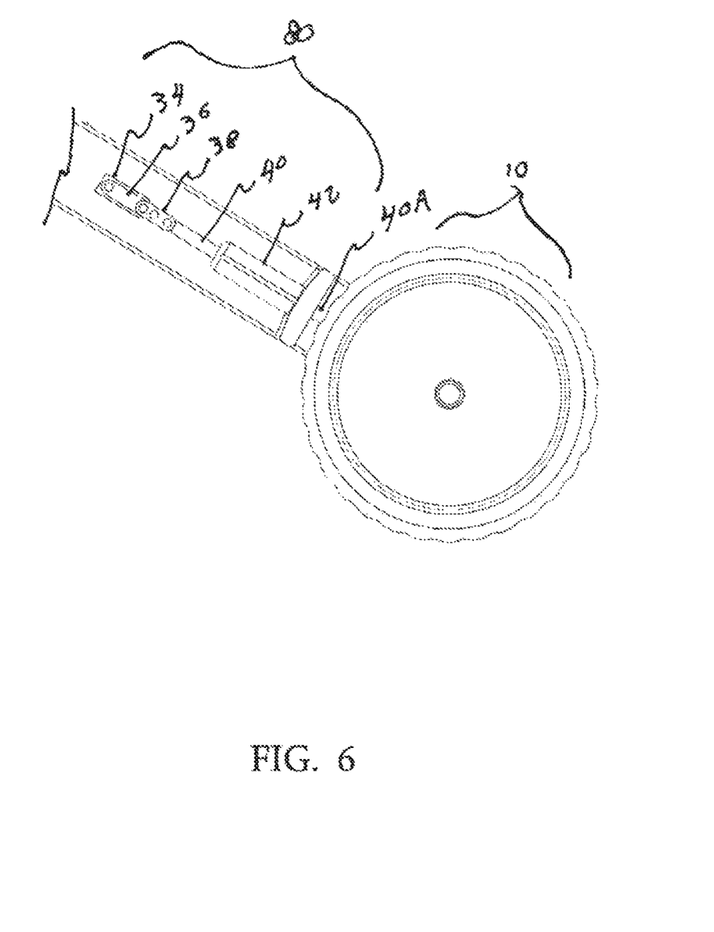
FIG. 6 is a partial side view of the frame and non-swivel wheel with the brake assembly housing removed and the brake post in the engaged position.

FIG. 6 is the same view as FIG. 5 except that post tip 40A is in the engaged position by inserting itself into a depression 32 of the tire of wheel 10. This is the default position of the post tip 40A when the momentary switches 6, 8 are not being pressed by the user. In this way, the rollator 100 remains in a non-rolling condition if and when a user accidentally releases the momentary switches 6, 8 thereby reducing the chance of a runaway rollator and in turn reducing the chance that a user might fall during the accidental loss of control of the rollator. According to some embodiments, tip 40a comprises a brake pad and, when the brake assembly is engaged, the post extends from the linear bearing and presses the brake pad against a surface of the wheel. The braking mechanism 80 is in the locked position if the portable power supply runs out thereby eliminating the ability to use the rollator unless there is sufficient power to operate the brake mechanism 80. According to one embodiment, assembly 80 is driven into the engaged, default condition by a mechanical device, such as spring (not shown) and the servo motor disengages the post tip 40A by exerting force against the action of the spring. Additionally, the rollator is in a stable non-rolling condition when the user decides to sit on seat 18, since the user would not likely be pushing on momentary switches 6, 8 at that time.

Figure 7:
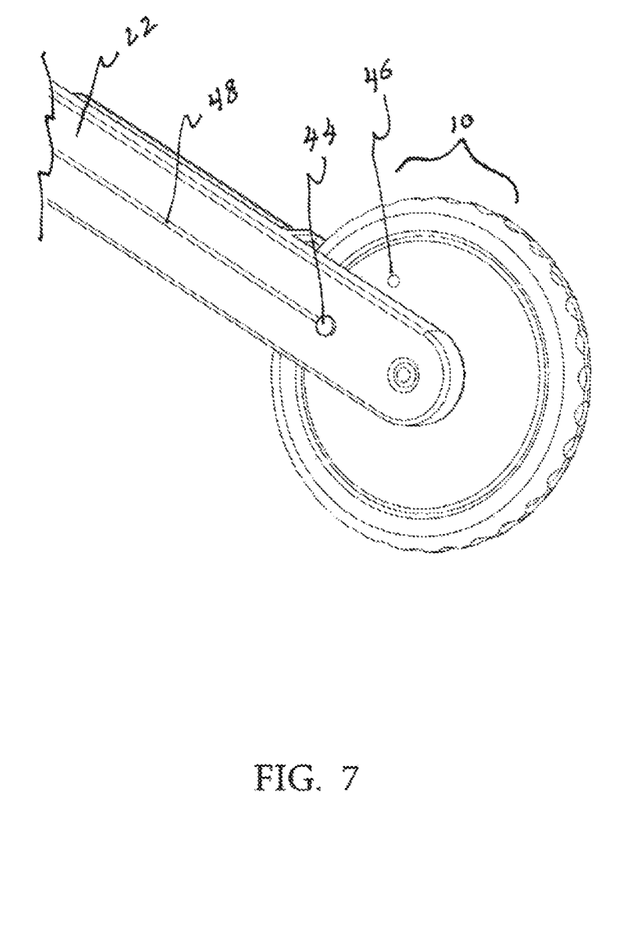
FIG. 7 is a partial side view of the frame and non-swivel wheel showing the magnetic portion of the pedometer assembly.

FIG. 7 is a partial view of frame member 22 seen from the opposite side. A magnet 46 attached to the hub of wheel 10 rotates with each revolution of the wheel 10. A reed switch 44 mounted on the frame 22 registers each revolution of the magnet 46 and sends the information to pedometer assembly 28 via cable 48. The pedometer can then translate rotations into total distance traveled, and calculate calories burned and/or collect and display other information.

Figure 8:
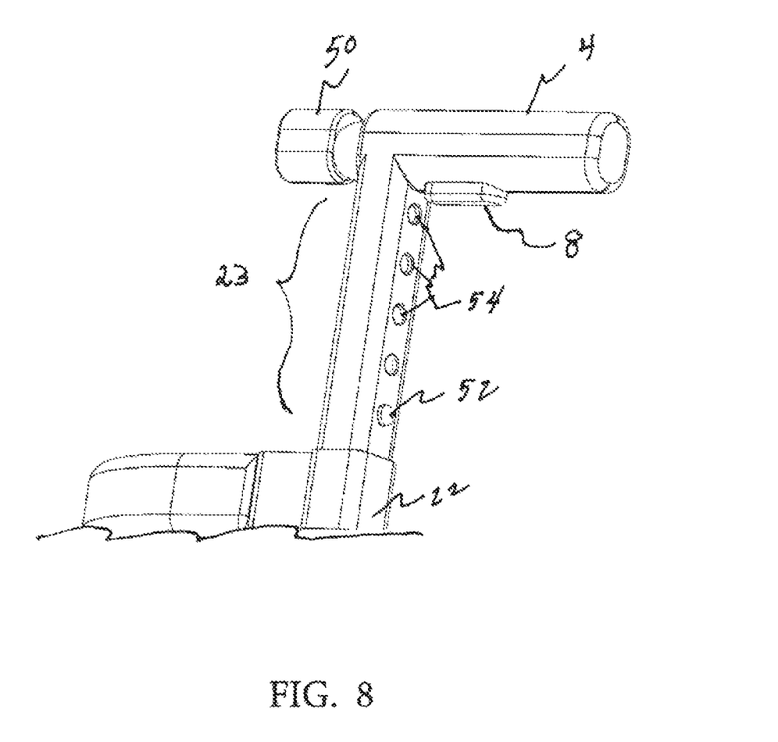
FIG. 8 is a partial perspective view of a hand grip and adjustable height frame member as well as a momentary brake switch.

FIG. 8 is a partial perspective view of one of the two handles 4 showing LED 50 attached to the front end. Momentary switch 8 can be seen on the underside of handle 4. Switch 6 is located at the corresponding position on handle 2 of frame member 24. Switches 6, 8 are positioned so that the user's fore finger can easily engage the switch when wanting to travel. According to one embodiment, when either switch 8, 6 is released by the user, the brake assembly 80 is automatically engaged. Vertical frame portion 23 can slide within tubular frame portion 22 and be locked to a preferred height by spring biased locking button 52 as it enters into the selected aperture 54.

Figure 9:
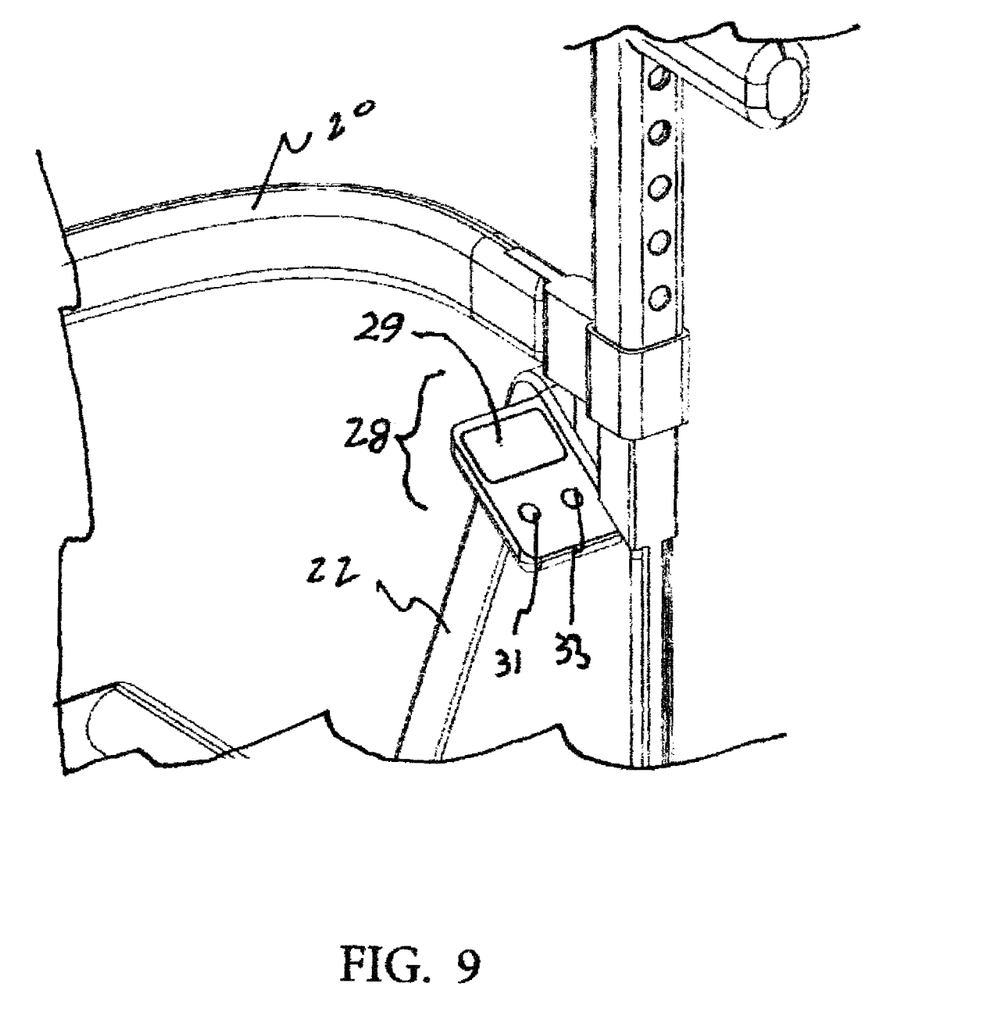
FIG. 9 is a partial perspective view showing the pedometer housing.

FIG. 9 is a partial perspective view showing the pedometer assembly 28 that includes an LED screen 29 which shows distance traveled. The pedometer can be turned on or off via button 31, and total calories burned can be displayed by pushing button 33.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A mobility assistance device comprising:
a rigid frame assembly;
a pair of wheels rotatably mounted at a bottom end of the frame, wherein each wheel comprises a tire along a perimeter of the wheel, wherein each tire comprises a plurality of depressions facing radially outward;
one or more support handles located at a top end of the frame;
one or more momentary electrical switches, wherein each of the one or more electrical switches is located proximate a respective one of the support handles, wherein each of the one or more electrical switches comprises a respective actuator grip, wherein each respective actuator grip is adapted to be gripped by a user when the user holds the respective handle; and
a pair of electro-mechanical brake assemblies located proximate to respective ones of the wheels and each assembly adapted to engage the respective wheel to inhibit rotation and electrically connected with and controlled by each electrical switch, wherein each electromechanical brake assembly comprises a linearly actuating engagement rod, and
wherein each of said brake assemblies extends each rod to engage with one of the depressions of the tire of the respective wheel to inhibit rotation of the respective wheel when said one or more momentary electrical switches is not actuated and wherein each of said brake assemblies withdraws each rod from engagement with the one of the depressions to allow rotation of the respective wheel when said one or more momentary electrical switches is actuated by the user.

2. The device of claim 1, further comprising one or more of a seat member, a back-rest member, and a carrying compartment connected with the frame.

3. The device of claim 1, further comprising one or more forward facing swivel wheels rotatably mounted at the bottom end of the frame.

4. The device of claim 1, wherein the pair of wheels comprise two rear facing non-swivel wheels rotatably mounted at the bottom end of the frame and adapted to rotate parallel with one another.

5. The device of claim 1, wherein each respective actuator grip is located below the respective handle.

6. The device of claim 1, further comprising an electric power source electrically connected with the one or more electrical switches and each brake assembly, wherein when no electrical power is provided by the power source, each brake assembly is engaged to inhibit rotation.

7. The device of claim 6, wherein the electrical power source is a portable battery.

8. The device of claim 1 further comprising one or more LED lights mounted on front ends of respective ones of the support handles, wherein said LED lights are aimable by the user.

9. The device of claim 1 wherein each said electromechanical brake assembly comprises:
   a servo motor including a shaft electrically connected with the one or more electrical switches;
   a first linkage member attached to the shaft;
   a second linkage member attached to said first linkage member; and
   a linear bearing assembly mounted to the frame;
   wherein each linearly actuating engagement rod is attached to said second linkage member, wherein each rod is slidably retained in the linear bearing assembly and positioned to engage with the one of the depressions to inhibit rotation of the respective wheel.

10. The device of claim 9, wherein each rod is mechanically biased to engage the respective wheel when no electrical power is applied to the servo motor.

11. The device of claim 1, further comprising a pedometer, wherein the pedometer measures a distance traversed by the user operating the device.

12. The device of claim 11, wherein the pedometer comprises a rotation counter coupled with the wheels, wherein the distance traversed is measured by counting rotations of the wheels.

13. The device of claim 12, wherein the rotation counter comprises one or more of an optical sensor, and a magnetic sensor.

14. The device of claim 1, wherein the one or more electrical switches and one or more handles comprise two electrical switches located proximate two respective handles.

15. The device of claim 14, wherein actuation of either one or both of the two switches causes each brake assembly to disengage the respective wheel to allow rotation.

16. The device of claim 14, wherein only actuation of both of the switches causes each brake assembly to disengage the respective wheel and allow rotation.

17. The mobility assistance device of claim 1,
   wherein the one or more support handles comprise two support handles located at a top end of the frame on opposite sides of the frame;
   wherein the one or more momentary electrical switches comprise two respective momentary electrical switches, each located proximate a respective one of the two support handles; and
   wherein each said brake assembly is engaged to inhibit rotation when either of the two momentary electrical switches is not actuated and wherein each said brake assembly is unengaged to allow rotation when both of the momentary electrical switches are actuated by the user.

* * * * *